United States Patent
Ishikawa et al.

(10) Patent No.: US 8,801,283 B2
(45) Date of Patent: Aug. 12, 2014

(54) ELECTRIC CIRCUIT BODY FOR MEASURING TEMPERATURE

(75) Inventors: Satoshi Ishikawa, Makinohara (JP); Susumu Yamamoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 482 days.

(21) Appl. No.: 12/656,679

(22) Filed: Feb. 12, 2010

(65) Prior Publication Data
US 2010/0202490 A1 Aug. 12, 2010

(30) Foreign Application Priority Data
Feb. 10, 2009 (JP) ................................. 2009-028411

(51) Int. Cl.
*G01K 7/00* (2006.01)
(52) U.S. Cl.
USPC ................................................... 374/165
(58) Field of Classification Search
USPC ................................................... 374/165
See application file for complete search history.

(56) References Cited

U.S. PATENT DOCUMENTS

| | | |
|---|---|---|
| 6,444,350 B1 | 9/2002 | Toya et al. |
| 2005/0226308 A1* | 10/2005 | Hudson .......................... 374/152 |
| 2006/0209920 A1* | 9/2006 | Kamiyama et al. .............. 374/29 |
| 2008/0056331 A1* | 3/2008 | Matias et al. .................. 374/185 |
| 2009/0130545 A1* | 5/2009 | Wood et al. ...................... 429/90 |

FOREIGN PATENT DOCUMENTS

| | | |
|---|---|---|
| JP | 56077731 A | 6/1981 |
| JP | 6393533 U | 6/1988 |
| JP | 3670907 | 4/2005 |
| JP | 2005278344 A | 10/2005 |
| JP | 2008196936 A | 8/2008 |

OTHER PUBLICATIONS

Japanese Office Action mailed on Jan. 22, 2013 for corresponding Japanese Application No. 2009-028411.

* cited by examiner

*Primary Examiner* — Mirellys Jagan
(74) *Attorney, Agent, or Firm* — Edwards Wildman Palmer LLP

(57) ABSTRACT

A circuit body includes a flexible insulation sheet with an electric circuit pattern having wiring patterns and a temperature sensor arranged in the electric circuit pattern. The electric circuit pattern has a temperature-sensor connecting portion and a heat-concentrating pattern formed integrally with the temperature-sensor connecting portion so as to have a larger width than that of the wiring pattern. The temperature sensor is touched through the heat-concentrating pattern to an object to be measured. The wiring patterns and the heat-concentrating pattern are formed integrally on a primary surface of the insulation sheet by printing. An additional heat-concentrating pattern is further formed on a secondary surface of the insulation sheet at a position corresponding to the temperature-sensor connecting portion. The heat-concentrating patterns are bent integrally with the insulation sheet and touched to the object to be measured.

8 Claims, 3 Drawing Sheets

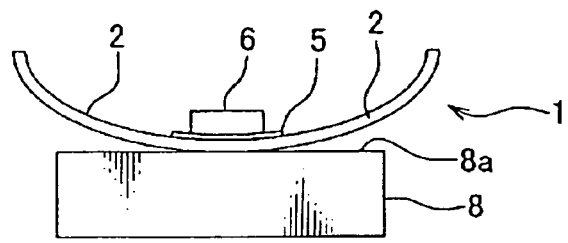
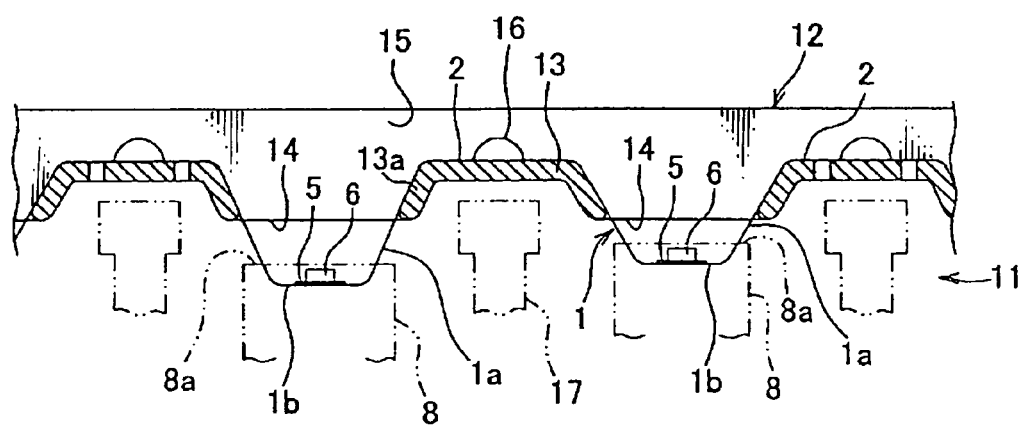

ELECTRIC CIRCUIT BODY FOR MEASURING TEMPERATURE

The priority application Number Japan Patent Application 2009-028411 upon which this patent application is based is hereby incorporated by reference.

BACKGROUND OF THE INVENTION

1. Field of the Invention

This invention relates to an electric circuit body for measuring a temperature of a battery of an electric vehicle and the like.

2. Description of the Related Art

FIG. 5 shows an embodiment of an electric circuit body for measuring a temperature by prior art (refer Japan Patent Document 1).

The electric circuit body 31 for measuring a temperature is structured by arranging alternatively temperature sensors 33 and heat-concentrating plate 34 made of an electric conductive metal corresponding to each of a plurality of battery cells 32 connected in series for a battery assembly for an electric vehicle. The temperature sensor 33 is connected to a lead 34a of the heat-concentrating plate 34. End of each of the temperature sensors 33 at the both ends of the connected temperature sensors 33 and the heat-connecting plate 34 is connected to a lead wire 35.

A PTC element or a thermister can be used as the temperature sensor 33. A resistance value of each of them is changed according to temperature. The resistance of the PTC element will be changed rapidly. The resistance of the thermister will be changed moderately.

A temperature abnormality of the plurality of battery cells 32 (unexpected temperature rising more than a specified value) is detected by gathering heat of the battery cells 32, including a battery cell having no temperature sensor 33, through the heat-concentrating plate 34 and transmitting the heat to the temperature sensor 33, and inputting the total resistance value of the temperature sensors connected in series to a controller (not shown) through the lead wire 35. Japan Patent Published No. 3670907 (FIGS. 1, 2) can be referred.

SUMMARY OF THE INVENTION

Objects to be Solved

In the electric circuit body 31 for measuring a temperature by Prior Art, the rigid heat-concentrating plate 34 is used, so that the electric circuit body 31 has poor flexibility. Thereby, there are problems that the temperature sensor 33 is not easily arranged between battery cells having a step therebetween (not shown), and that a cost of the heat-concentrating plate 34 will be high. Additionally, it is concerned that the temperature of the battery cell 32, in which the heat-concentrating plate 34 is arranged but instead the temperature sensor 33 is not arranged, will be measured less preciously than that of the battery cell 32 in which the temperature sensor 33 is arranged. The temperature sensor 33 is arranged at the end of the heat-concentrating plate 34, so that radiation of heat at the heat-concentrating plate 34 will affect accuracy of measuring temperature to be lower.

According to the above problems, an object of the present invention is to provide an electric circuit body for measuring temperature, which can be bendable to fit flexibly to a profile of battery cells (object to be measured) and solve a cost issue caused by a heat-concentrating plate and improve accuracy of measuring temperature.

How to Attain the Object of the Present Invention

In order to overcome the above problems and attain the object of the present invention, an electric circuit body for measuring temperature includes an electric circuit pattern formed at a flexible insulation sheet and a temperature sensor arranged in the electric circuit pattern; and the electric circuit pattern includes a wiring pattern, a temperature-sensor connecting portion connected with the temperature sensor, and a heat-concentrating pattern formed integrally with the temperature-sensor connecting portion so as to have a larger width than that of the wiring pattern; and the temperature sensor is touched through the heat-concentrating pattern to an object to be measured.

According to the above structure, the temperature sensor is arranged so as to be stacked on the heat-concentrating pattern and the insulation sheet in a direction of thickness of the insulation sheet. Thereby, the temperature sensor can touch thermally through the heat-concentrating pattern and the insulation sheet to the object to be measured, such as a battery. The heat-concentrating pattern concentrates heat of the object to be measured and transfers the heat efficiently to the temperature, sensor, and the temperature sensor can measure the temperature of the object to be measured rapidly and accurately. By forming the heat-concentrating pattern integrally with the wiring pattern into a thin film shape, the electric circuit body including the insulation sheet, the wiring pattern and the heat-concentrating pattern can be bent freely.

In the electric circuit body for measuring temperature according to the present invention, the electric circuit body mentioned above is characterized in that the wiring pattern and the heat-concentrating pattern are formed integrally on a primary surface of the insulation sheet by printing.

According to the above structure, the wiring pattern and the heat-concentrating pattern are formed simultaneously by printing, so that the electric circuit can be formed easily in low cost. For forming the heat-concentrating pattern thicker than the wiring pattern, the heat-concentrating pattern shall be printed repeatedly (to be multiple layer).

In the circuit body for measuring temperature according to the present invention, the electric circuit body mentioned above is further characterized in that an additional heat-concentrating pattern is arranged on a secondary surface of the insulation sheet at a position corresponding to the heat-concentrating pattern.

According to the above structure, the additional heat-concentrating pattern can touch directly to the object to be measured, and concentrate heat of the object to be measured rapidly and accurately, and can transfer the heat of the additional heat-concentrating pattern through the insulation sheet and the heat-concentrating pattern in the direction of the thickness of the insulation sheet to the temperature sensor accurately.

In the circuit body for measuring temperature according to the present invention, an electric circuit body for measuring temperature includes an electric circuit pattern formed on a primary surface of a flexible insulation sheet and a temperature sensor arranged in the electric circuit pattern and connected to the electric circuit pattern; and the electric circuit pattern includes a wiring pattern, a temperature-sensor connecting portion, and a heat-concentrating pattern formed on a secondary surface of the insulation sheet at a position corresponding to the temperature-sensor connecting portion so as to have a larger width than that of the wiring pattern; and the temperature sensor is touched through the heat-concentrating pattern to an object to be measured.

According to the above structure, the temperature sensor is arranged so as to be stacked on the heat-concentrating pattern and the insulation sheet in a direction of thickness of the insulation sheet. Thereby, the heat-concentrating pattern can touch directly to the object to be measured, such a battery, and concentrate heat of the object to be measured rapidly and securely, and transfer the heat of the heat-concentrating pattern through the insulating sheet to the temperature sensor. By forming the heat-concentrating pattern into a thin film shape as the wiring pattern, the electric circuit body including the insulation sheet, the wiring pattern and the heat-concentrating pattern can be bent freely.

In the circuit body for measuring temperature according to the present invention, the electric circuit body mentioned above is further characterized in that the heat-concentrating pattern is curvedly formed integrally with the insulation sheet, and the temperature sensor touches through the curved heat-concentrating pattern to the object to be measured.

According to the above structure, the heat-concentrating pattern is flexible and can be bent integrally with the insulation sheet similarly as the wiring pattern, so that the electric circuit body can be wired flexibly along a step and curvature of a profile of the object to be measured.

Effects of the Invention

According to the present invention, since the electric circuit body can be bent integrally, the temperature sensor can be arranged corresponding to a profile of the object to be measured. By forming the heat-concentrating pattern integrally with the wiring pattern, the cost caused by a heat-concentrating plate by prior art can be solved, so that the electric circuit body for measuring temperature can be provided in a low cost. By stacking the temperature sensor, the heat-concentrating pattern and the insulation sheet in the direction of thickness of the insulation sheet, the heat of the object to be measured can be transferred efficiently to the temperature sensor and the temperature can be measured more accurately.

According to the present invention, by forming the wiring pattern and the heat-concentrating pattern simultaneously by printing, the heat-concentrating pattern can be manufactured easily in a low cost.

According to the present invention, by making the heat-concentrating pattern touch directly to the object to be measured, temperature of the object can be measured more accurately.

According to the present invention, by forming the electric circuit body curvedly together, the temperature sensor can be arranged corresponding to the profile of the object to be measured. By forming the heat-concentrating pattern and the wiring pattern simultaneously by printing, a cost issue by the heat-concentrating pattern can be solved, and the electric circuit body for measuring temperature can be provided in a low cost. By stacking the temperature sensor, insulation sheet and the heat-concentrating pattern in the direction of thickness of the insulation sheet, the heat of the object to be measured can be transferred efficiently to the temperature sensor and the temperature can be measured more accurately.

According to the present invention, the heat-concentrating pattern can be bent integrally with the insulation sheet and the wiring pattern, so that the temperature sensor can be arranged corresponding to the profile of the object to be measured.

The above and other objects and features of this invention will become more apparent from the following description taken in conjunction with the accompanying drawings.

BRIEF DESCRIPTION OF THE DRAWINGS

FIG. 3 is a front view showing a condition in which the temperature sensor of the electric circuit body is touched on an object to be measured;

FIG. 4 is a cross-sectional view of one application of the electric circuit body according to the present invention.

DESCRIPTION OF THE PREFERRED EMBODIMENT

First Embodiment

Figure 1A:
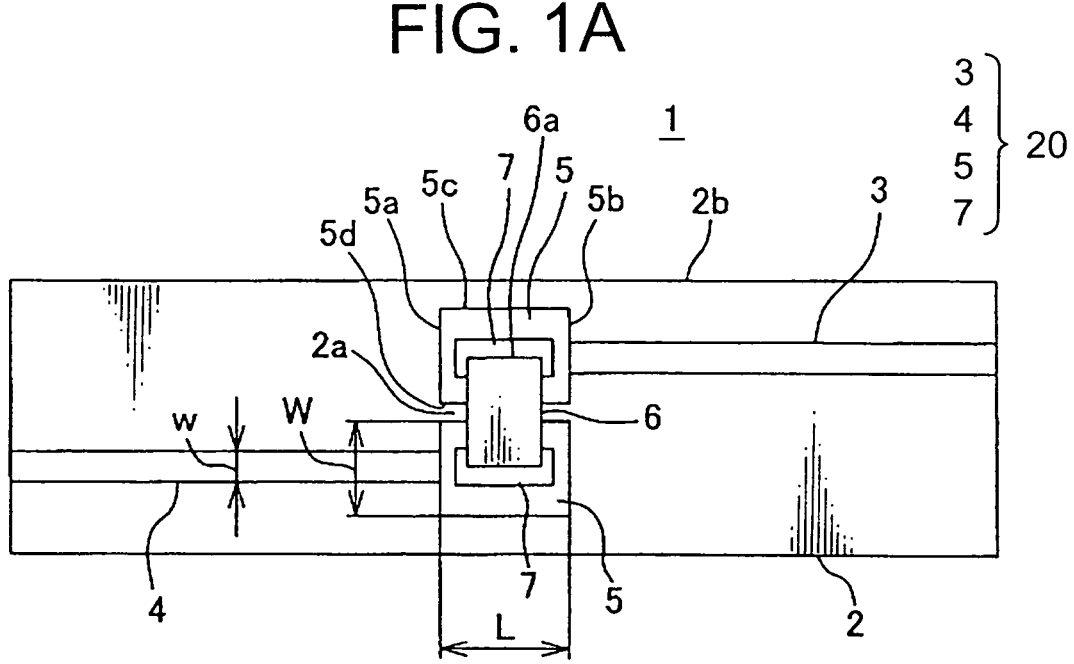
FIG. 1A is a plan view of one embodiment of an electric circuit body according to the present invention.
Figure 1B:
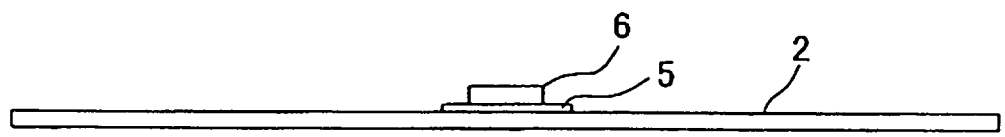
FIG. 1B is a front view of the electric circuit body shown in FIG. 1A.

FIGS. 1A, 1B show one embodiment of an electric circuit body according to the present invention.

As shown in FIG. 1A, the electric circuit body 1 for measuring temperature includes a flexible slip-shaped insulation sheet 2; two wiring patterns 3, 4 made of flexible electric-conductive thin metal film on a primary surface of the insulation sheet 2; a wide-width heat-concentrating pattern 5 formed integrally with each of the two wiring patterns 3, 4 at each of ends of the two wiring patterns 3, 4 facing to each other; a temperature-sensor connecting portion 7 at each of the heat-concentrating patterns 5, and a temperature sensor 6 connected to the temperature-sensor connecting portions 7 at both terminal ends (not shown) of the temperature sensor 6 by soldering. The two wiring patterns 3, 4, heat-concentrating patterns 5 and the temperature-sensor connecting portions 7 structure an electric circuit pattern 20.

The two wiring patterns 3, 4 are formed on the insulation sheet 2 by printing, and each heat-concentrating pattern 5 is formed simultaneously by printing. The wiring patterns 3, 4 and heat-concentrating patterns 5 are formed with a flexible electric-conductive thin metal film. In this embodiment, the heat-concentrating patterns 5 are formed thicker than the wiring patterns 3, 4 so as to project from the surface of the insulation sheet 2 as shown in FIG. 1B.

The wiring patterns 3, 4 are arranged to be spaced to each other in a direction of widthwise of the insulation sheet 2 and separated alternately to each other in a direction of lengthwise of the insulation sheet 2. The heat-concentrating patterns 5 at each end of the wiring patterns 3, 4 are arranged to face to each other. A front edge 5a and rear edge 5b of the heat-concentrating patterns 5 are spaced to each other along the direction of lengthwise of the insulation sheet.

The heat-concentrating pattern 5 can be formed about a thickness as same as the wiring patterns 3, 4. The wiring patterns 3, 4 and the heat-concentrating patterns 5 can be formed by adhering cupper foil or by metal evaporation. The heat-concentrating patterns 5 preferably may be formed so as to be bent freely integrally with the insulation sheet, so that the electric circuit body 1 can be flexible.

The electric circuit body 1 is a flexible flat circuit body. The wiring patterns 3, 4 may be preferably protected by covering them with a insulation film (not shown) made of synthetic resin. The heat-concentrating patterns 5 and the wiring patterns 3, 4 are electric conductive parts of the electric circuit pattern 20.

The heat-concentrating pattern 5 is formed into a rectangular shape along the direction of lengthwise of the insulation sheet 2. The heat-concentrating pattern 5 can be formed into a square shape or a round shape. A width "W" of the heat-concentrating pattern 5 is formed several times wider than a width "w" of the wiring patterns 3, 4.

The sensor connecting portion 7 is arranged at the center of each of the heat-concentrating patterns 5. Each of terminal ends of the temperature sensor 6 is connected to the sensor connecting portion 7 so as to bridge between the sensor connecting portions 7. The sensor connecting portion 7 is arranged at a position extended from the end of each of wiring patterns 3, 4. A center narrow gap 2a is formed between the heat-concentrating patterns 5 to separate the heat-concentrating patterns 5. The temperature sensor 6 is aligned about the lengthwise thereof along the direction of widthwise of the insulation sheet 2. The heat-concentrating patterns 5 may be preferably protected and insulated with an elastic insulation resin (not shown).

End 6a of each of the terminal ends of the temperature sensor 6 is arranged at the center of the heat-concentrating pattern 5 or nearer to the center narrow gap 2a. An outer edge 5c of each of heat-concentrating patterns 5 is arranged outside the wiring pattern 3, 4 so as to extend near to each of side edges 2b of the insulation sheet 2 in the direction of widthwise of the insulation sheet 2. An inner edge 5d of each of heat-concentrating patterns 5 is arranged inside the wiring pattern 3, 4. A length L of each of the heat-concentrating patterns 5 along the direction of lengthwise of the insulation sheet 2 is formed longer than the width of the temperature sensor 6 along the direction of lengthwise of the insulation sheet 2. The temperature sensor 6 is arranged at the center of the heat-concentrating patterns along the direction of lengthwise of the insulation sheet 2 so as to equalize distances from the edges of the temperature sensor 6 in the direction of lengthwise to the front end 5a and the rear edge 5b of the heat-concentrating pattern 5. Total of each area of projection of heat-concentrating patterns 5 is larger than an area of projection of the temperature sensor 6.

The width "W" of the heat-concentrating pattern 5 is formed enough larger than the width "w" of the wiring pattern 3, 4, so that heat of the battery 8 (the object to be measured) in FIG. 3 can be concentrated rapidly and securely by the heat-concentrating patterns 5. The wiring patterns 3, 4 are not touched to the battery 8 and are enough narrower than the heat-concentrating pattern 5, so that the wiring patterns 3, 4 do not concentrate easily and are not heated easily, that is they have larger heat resistance. Accordingly, the temperature of the battery 8 can be measured accurately.

Figure 2:
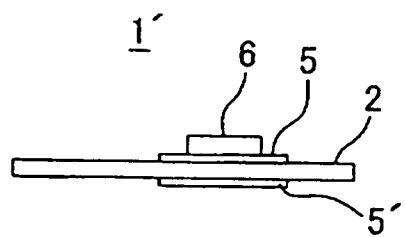
FIG. 2 is a front view of the other embodiment about a heat-concentrating pattern of the electric circuit body according to the present invention.
Figure 5:
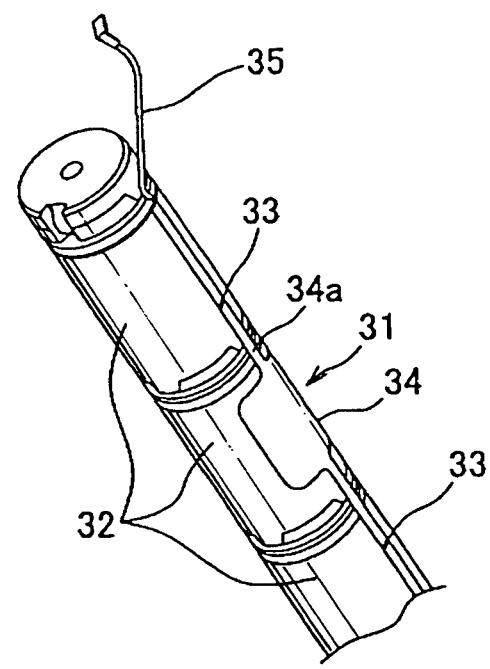
FIG. 5 is a perspective view of an embodiment of an electric circuit body for measuring temperature by prior art.

In the embodiment shown in FIGS. 1A, 1B, the heat-concentrating pattern 5 is provided at the primary surface of the insulation sheet 2. Instead, as shown in FIG. 2, the metal thin film heat-concentrating patterns 5, 5' can be provided at both surfaces of the primary surface and a secondary surface of the insulation sheet 2. The additional heat-concentrating pattern 5' is formed by printing or adhering or evaporation so as to be separated from the wiring patterns 3, 4 (FIGS. 1A, 1B). The additional heat-concentrating pattern 5' is only for concentrating heat, so that electric conductivity is not required for it.

The additional heat-concentrating pattern 5' is arranged corresponding to the heat-concentrating pattern 5. The additional heat-concentrating patterns 5' are formed at the secondary surface of the insulation sheet 2 to have the same shape of the heat-concentrating patterns 5 shown in FIG. 1A. The additional heat-concentrating pattern 5' can have different shape other than the heat-concentrating pattern 5. The additional heat-concentrating pattern 5' can be covered with synthetic insulation film (not shown), but it is preferably exposed for concentrating heat.

The heat-concentrating pattern 5 at the primary surface of the insulation sheet 2 can be removed and only the additional heat-concentrating pattern 5' can be formed at the secondary surface of the insulation sheet 2. The additional heat-concentrating pattern 5' at the secondary surface and the wiring patterns 3, 4 at the primary surface can be easily formed simultaneously or unsimultaneously by printing or adhering. The additional heat-concentrating pattern 5' can be formed same thick as or thicker than the wiring patterns 3, 4, but preferably so as to have flexibility similar as the wiring patterns 3, 4.

FIG. 3 shows a condition which the electric circuit body 1 for measuring temperature is touched to the battery 8 as the object to be measured. The heat-concentrating pattern 5 of the electric circuit body 1 is shown in FIGS. 1A, 1B.

The electric circuit body 1 is bent curvedly so as to push out the secondary surface downwardly at the temperature sensor 6. The temperature sensor 6 is pushed through the insulation sheet 2 and the heat-concentrating pattern 5 to an upper surface 8a of the battery 8. The heat-concentrating portion 5 is heated by concentrating (absorbing) the heat of the battery 8, and the concentrated heat is transferred to the temperature sensor 6. Thereby, the temperature sensor 6 can measure the temperature of the battery 8 accurately without measuring error.

The heat-concentrating pattern 5 is bent integrally with the insulation sheet 2, the wiring patterns 3, 4. The heat-concentrating pattern 5 is touched at a large area of the battery 8 through the insulation sheet 2 by a restoring force to return to be flat by elasticity. Thereby, heat concentration is acted efficiently. The heat-concentrating pattern 5 can be touched to keep a flat shape to the battery 8.

The electric circuit body 1' having the heat-concentrating pattern 5 and the additional heat-concentrating pattern 5' on the both surfaces of the insulation sheet 2 shown in FIG. 2 is bent as shown in FIG. 3. The electric circuit body 1' is curved so as to push out the temperature sensor 6 downwardly so as to touch the additional heat-concentrating pattern 5' with the upper surface 8a of the battery 8. The temperature sensor 6 is pushed through the heat-concentrating pattern 5 and the insulation sheet 2 and the additional heat-concentrating pattern 5' to the battery 8. The additional heat-concentrating pattern 5' concentrates (collects) heat of the battery 8 rapidly and transfers the heat through the insulation sheet 2 to the upper heat-concentrating pattern 5. The concentrated heat is transferred to the temperature sensor 6, so that the temperature sensor 6 can measure the temperature of the battery 8 accurately without measuring error.

Both of the heat-concentrating pattern 5 and the additional heat-concentrating pattern 5' is bent integrally with the insulation sheet 2 and the wiring patterns 3, 4. The additional heat-concentrating pattern 5' is touched at a large area of the battery 8 through the insulation sheet 2 by a restoring force to return to be flat by elasticity. Thereby, heat concentration is acted efficiently. The heat-concentrating pattern 5 and the additional heat-concentrating pattern 5' can be touched to keep a flat shape to the battery 8.

According to the example shown in FIG. 3, the flat circuit body 1 is curved (bent) with a large radius of curvature, so that the temperature sensor 6 is pushed to the battery 8 by elastic restoring force of the insulation sheet 2. For pushing the temperature sensor 6 to the battery 8 by a larger restoring force, the insulation sheet 2 may be curved with a smaller radius of curvature.

In FIG. 1, one temperature sensor 6 is arranged. For measuring temperature of each of plural batteries 8 structuring the battery unit 11 (FIG. 4) for a electric vehicle including a hybrid vehicle, it is required that the plural temperature sensors 6 are arranged in series in a direction along lengthwise of the elongated (strip-shaped) insulation sheet 2. The heat-concentrating pattern 5, 5' is arranged corresponding to each temperature sensor 6 (the heat-concentrating pattern may be arranged at one surface or both surfaces of the insulation sheet 2).

When the plural temperature sensors 6 are arranged, assuming that one end of the temperature sensor 6 is defined as a positive electrode and the other end thereof is defined as a negative electrode, the plural temperature sensors 6 are arranged at intervals in a direction of lengthwise of the insulation sheet 2. The wiring patterns 3, 4 are arranged so as to extend along the direction of lengthwise of the insulation sheet 2. The end of the wiring pattern 3 is connected with the one end of the temperature sensor 6 as the negative electrode. The end of the wiring pattern 4 is connected with the other end of the temperature sensor 6 as the positive electrode. Thus, the temperature sensors 6 are connected successively with each of the wiring patterns 3, 4 in series.

FIG. 4 shows an example, in which the flat circuit body 1 having plural temperature sensors 6 connected in series is applied for measuring temperature of each battery 8 of the battery unit 11 of the electric vehicle. The heat-concentrating pattern 5 at the primary surface of the insulation sheet 2 of the circuit body 1 is shown.

The flat circuit body 1 is formed into a wave-shape and received in a case 12 made of insulation resin. The case 12 includes a bottom wall 13 having rectangular-shaped openings 14. The flat circuit body 1 is formed to have projections 1a, and each of the projections 1a is led through each of the openings 14. The temperature sensor 6 and the heat-concentrating pattern 5 are arranged at a bottom area of the projection 1a. When using the flat circuit body 1' designed to have heat-concentrating patterns 5, 5' at the both surfaces of the insulation sheet as shown in FIG. 2, the additional heat-concentrating pattern 5' is arranged at an outside surface, that is the secondary surface of the insulation sheet 2 at the bottom area of the projection 1a.

The projection 1a of the flat circuit body 1 in FIG. 4 is in an initial condition before contacting with each battery 8. When assembling the flat circuit body 1 with the battery unit 11, a top 1b of the projection 1a is pushed to the upper surface 8a of the battery 8, and the projection 1a is deformed upwardly so as to make the top 1b of the projection 1a, that is the temperature sensor 6, contact elastically to the upper surface 8a of the battery 8 through the insulation sheet 2 and the heat-concentrating pattern 5 by a restoring force. The top 1b of the projection 1a may contact to the battery 8 at a flat surface as FIG. 4, or at a curved surface.

The case 12 is formed into a gutter-shape so as to be surrounded about three directions, both sides and a bottom side, by side walls 15 and the bottom wall 13. The opening 14 of the bottom wall 13 is arranged at an end of a slant wall 13a. A projection 16 extending upwardly from the bottom wall 13 penetrates through a small hole (not shown) of the insulation sheet 2 and is caulked by heating so as to fix the insulation sheet 2. A method of fixing the insulation sheet 2 and design of case 12 can be modified when required. The batteries 8 are insulated between each others by insulation separator 17 as shown in FIG. 4. The wiring patterns 3, 4 are connected at front and rear ends of the insulation sheet 2 through terminals (not shown) to a control circuit (not shown).

In the above embodiment, a structure, in which the temperature sensor 6 is arranged at the projection 1a of the insulation sheet 2, is shown. The temperature sensor 6 can be arranged at a portion of the insulation sheet 2, which is curved in a 2-dimension or 3-dimension, so as to be fitted to a curving shape of an object to be measured (not shown). The heat-concentrating patterns 5, 5' of the flat circuit body 1, 1' may be elastically deformed together with the insulation sheet 2 so as to touch at area to the object to be measured.

In the above embodiment, the wiring patterns 3, 4 and the heat-concentrating pattern 5 are formed by printing and the wiring patterns 3, 4 are covered with the thin insulation film, so that the circuit body is built. The heat-concentrating pattern 5 can be formed by insert injection, in which the wiring patterns 3, 4 and the heat-concentrating pattern 5 made of thin cupper foil are arranged in a direction of thickness of the insulation sheet 2. By removing an area for soldering of the heat-concentrating pattern 5 of the insulation sheet 2, the terminals of the temperature sensor 6 can be connected to the heat-concentrating pattern 5 by soldering.

The present invention can be applied not only to a circuit body for measuring temperature, but also to a structure for measuring temperature and a method for measuring temperature.

While, in the embodiment, the present invention is described, it is not limited thereto. Various change and modifications can be made with the scope of the present invention.

INDUSTRIAL APPLICABILITY

The circuit body for measuring temperature according to the present invention can be applied to measure temperature for each battery cell of a battery unit of the electric vehicle including a hybrid vehicle. The circuit body for measuring temperature also can be applied to detect abnormal temperature rising of a control circuit and a component such as a relay in an electric connection box of the vehicle.

The invention claimed is:

1. An electric circuit body for measuring temperature, comprising:
    a flexible insulation sheet;
    an electric circuit pattern formed at the flexible insulation sheet, the electric circuit pattern comprising:
        a wiring pattern;
        a temperature-sensor connecting portion; and
        a heat-concentrating pattern formed integrally with the temperature-sensor connecting portion so as to have a larger width than that of the wiring pattern; and
    a temperature sensor formed on the temperature-sensor connecting portion of the electric circuit pattern,
    wherein the temperature sensor is touched through the heat-concentrating pattern to an object to be measured, and
    wherein the heat-concentrating pattern is configured to concentrate heat of the object to be measured and to transfer the heat to the temperature-sensor.

2. The electric circuit body according to claim 1,
    wherein the heat-concentrating pattern is curved integrally with the insulation sheet, and
    the temperature sensor is touched through the curved heat-concentrating pattern to the object to be measured.

3. The electric circuit body according to claim 1,
wherein an additional heat-concentrating pattern is arranged on a secondary surface of the insulation sheet at a position corresponding to the heat-concentrating pattern.

4. The electric circuit body according to claim 3,
wherein the heat-concentrating pattern is curved integrally with the insulation sheet, and
the temperature sensor is touched through the curved heat-concentrating pattern to the object to be measured.

5. The electric circuit body according to claim 1,
wherein the wiring pattern and the heat-concentrating pattern are formed integrally on a primary surface of the insulation sheet by printing.

6. The electric circuit body according to claim 5,
wherein the heat-concentrating pattern is curvedly formed integrally with the insulation sheet, and
the temperature sensor is touched through the curved heat-concentrating pattern to the object to be measured.

7. The electric circuit body according to claim 2,
wherein an additional heat-concentrating pattern is arranged on a secondary surface of the insulation sheet at a position corresponding to the heat-concentrating pattern.

8. The electric circuit body according to claim 7,
wherein the heat-concentrating pattern is curved integrally with the insulation sheet, and the temperature sensor is touched through the curved heat-concentrating pattern to the object to be measured.

* * * * *